US011370105B2

(12) United States Patent
Watanabe et al.

(10) Patent No.: US 11,370,105 B2
(45) Date of Patent: Jun. 28, 2022

(54) ROBOT SYSTEM AND METHOD FOR OPERATING SAME

(71) Applicant: KAWASAKI JUKOGYO KABUSHIKI KAISHA, Kobe (JP)

(72) Inventors: Masayuki Watanabe, Kobe (JP); Takayuki Yoshimura, Kakogawa (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 110 days.

(21) Appl. No.: 16/643,767

(22) PCT Filed: Aug. 27, 2018

(86) PCT No.: PCT/JP2018/031570
§ 371 (c)(1),
(2) Date: Mar. 2, 2020

(87) PCT Pub. No.: WO2019/044766
PCT Pub. Date: Mar. 7, 2019

(65) Prior Publication Data
US 2021/0154826 A1    May 27, 2021

(30) Foreign Application Priority Data
Aug. 31, 2017 (JP) .............................. JP2017-167120

(51) Int. Cl.
*B25J 19/02*  (2006.01)
*B25J 3/00*   (2006.01)
(Continued)

(52) U.S. Cl.
CPC ............... *B25J 3/00* (2013.01); *B25J 13/065* (2013.01); *B25J 19/023* (2013.01); *B25J 19/04* (2013.01)

(58) Field of Classification Search
CPC . B25J 13/06; B25J 19/04; B25J 13/065; B25J 13/00; B25J 13/02; B25J 19/023;
(Continued)

(56) References Cited

U.S. PATENT DOCUMENTS 7,203,573 B2 *  4/2007  Ban ....................... B25J 9/1697
                                                318/568.1
7,245,990 B2 *  7/2007  Watanabe ............. B25J 13/003
                                                318/568.1
(Continued)

FOREIGN PATENT DOCUMENTS

JP      2016-107379 A    6/2016
JP      2016-140958 A    8/2016
(Continued)

OTHER PUBLICATIONS

Zhang et al., A teleoperation system fora humanoid robot with multiple information feedback and operational modes, 2006, IEEE, p. 290-294 (Year: 2006).*

(Continued)

*Primary Examiner* — McDieunel Marc
(74) *Attorney, Agent, or Firm* — Oliff PLC

(57) ABSTRACT

A robot system includes an operating device that receives an operation instruction from an operator, a real robot that is installed in a work space and performs a series of works constituted of a plurality of steps, a camera configured to image the real robot, a display device configured to display video information of the real robot imaged by the camera and a virtual robot, and a control device, in which the control device is configured to operate the virtual robot displayed on the display device based on instruction information input from the operating device, and thereafter operate the real robot in a state that the virtual robot is displayed on the display device when operation execution information to (Continued)

execute an operation of the real robot is input from the operating device.

14 Claims, 16 Drawing Sheets

(51) Int. Cl.
  *B25J 13/06* (2006.01)
  *B25J 19/04* (2006.01)
(58) Field of Classification Search
  CPC .......... B25J 3/00; G06F 3/011; G05B 19/409; G05B 2219/39046; A61B 34/35; A61B 34/25; A61B 90/37; A61B 34/30; A61B 90/50; A61B 34/37; A61B 34/74; A61B 2090/508; A61B 2090/506; A61B 2017/00212; A61B 34/76
  See application file for complete search history.

(56) References Cited

U.S. PATENT DOCUMENTS

| | | | |
|---|---|---|---|
| 10,022,195 B2* | 7/2018 | Scholan | B25J 19/04 |
| 10,905,508 B2* | 2/2021 | Hashimoto | B25J 13/02 |
| 2016/0158937 A1 | 6/2016 | Kamoi et al. | |
| 2016/0288318 A1* | 10/2016 | Nakazato | B25J 9/1666 |
| 2017/0165841 A1* | 6/2017 | Kamoi | H04N 7/183 |
| 2018/0021952 A1 | 1/2018 | Fujieda et al. | |
| 2018/0178388 A1* | 6/2018 | Ishige | B25J 19/023 |
| 2018/0178389 A1* | 6/2018 | Aiso | G06T 7/80 |
| 2018/0304467 A1* | 10/2018 | Matsuura | B25J 9/1697 |
| 2018/0354140 A1 | 12/2018 | Watanabe | |
| 2018/0370038 A1* | 12/2018 | Isaac | B25J 9/163 |
| 2020/0156258 A1* | 5/2020 | Watanabe | G02B 27/0172 |

FOREIGN PATENT DOCUMENTS

| | | |
|---|---|---|
| JP | 2016-218534 A | 12/2016 |
| JP | 2016-221659 A | 12/2016 |
| WO | 2017/098713 A1 | 6/2017 |

OTHER PUBLICATIONS

Chen et al., A networked teleoperation system fora mobile robot with multiple viewpoints virtual scene, 2008, IEEE, pg. (Year: 2008 ).*

Bo et al., The Teleoperation Simulation System Based on VR, 2014, IEEE, pg. (Year: 2014).*

Keerio et al., Virtual Reality Based Teleoperation Control of Humanoid Robot BHR-2, 2007, IEEE, p. 1161-1165 (Year: 2007).*

* cited by examiner

[FIG. 1]
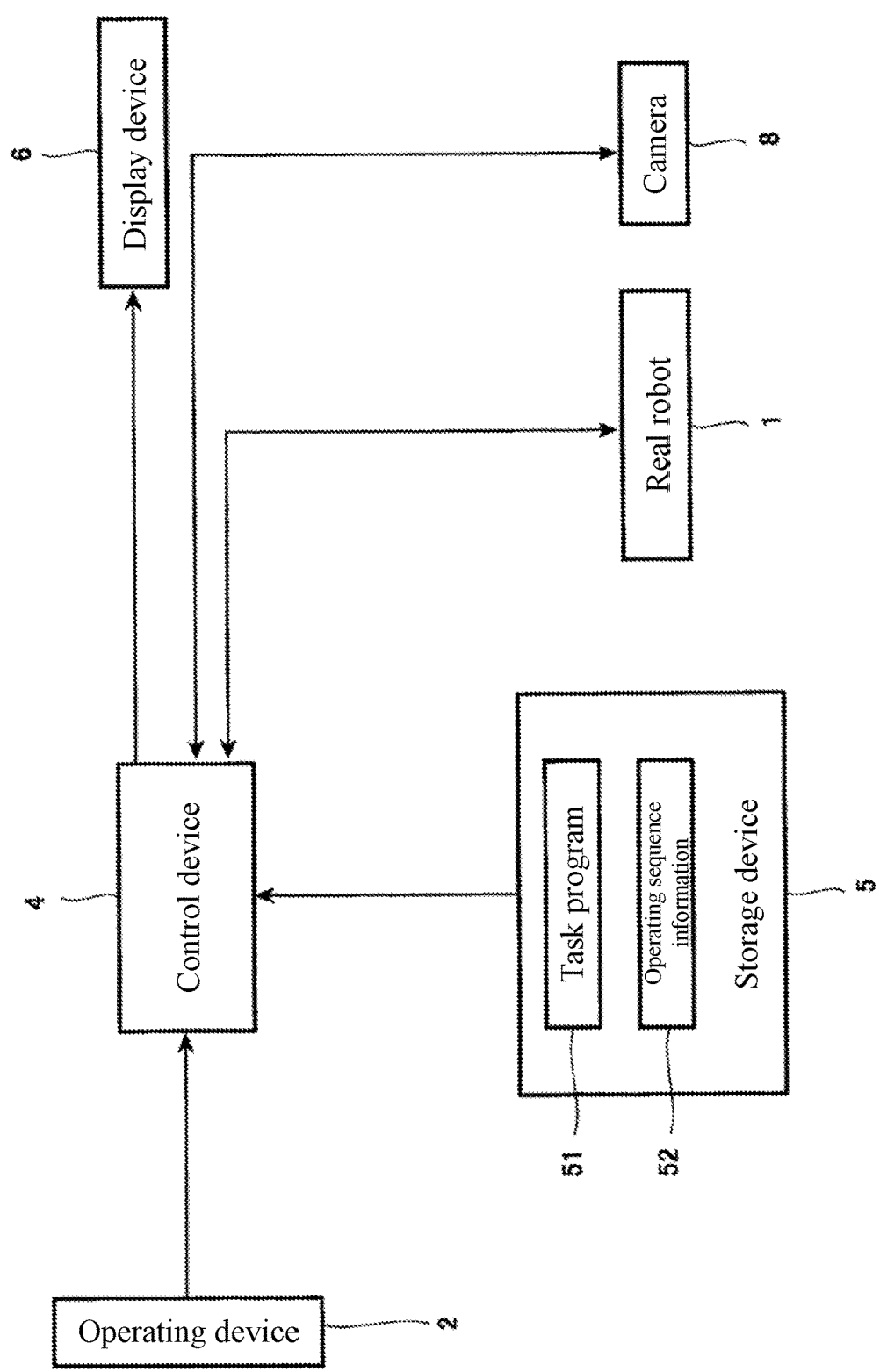

[FIG. 2]
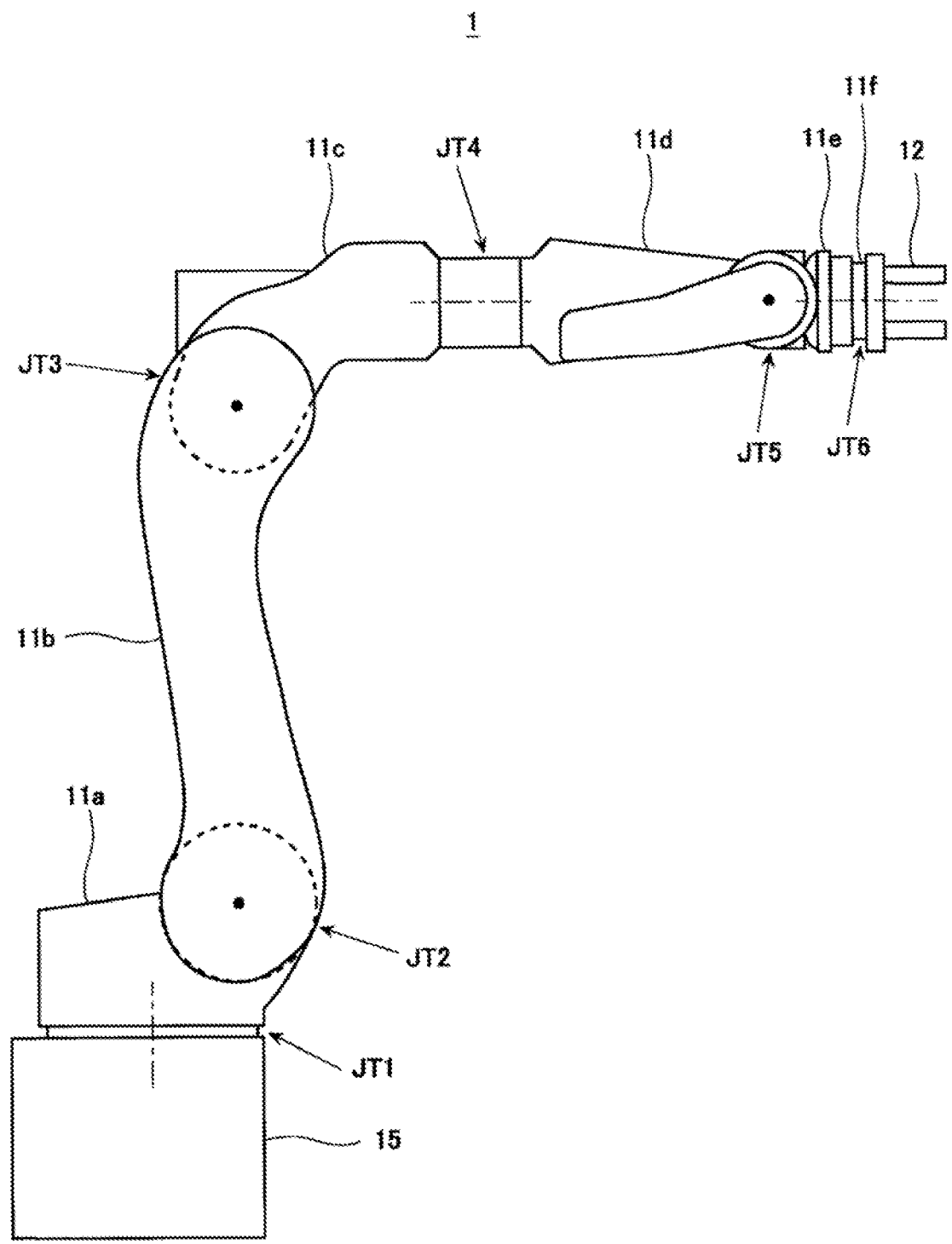

[FIG. 3]
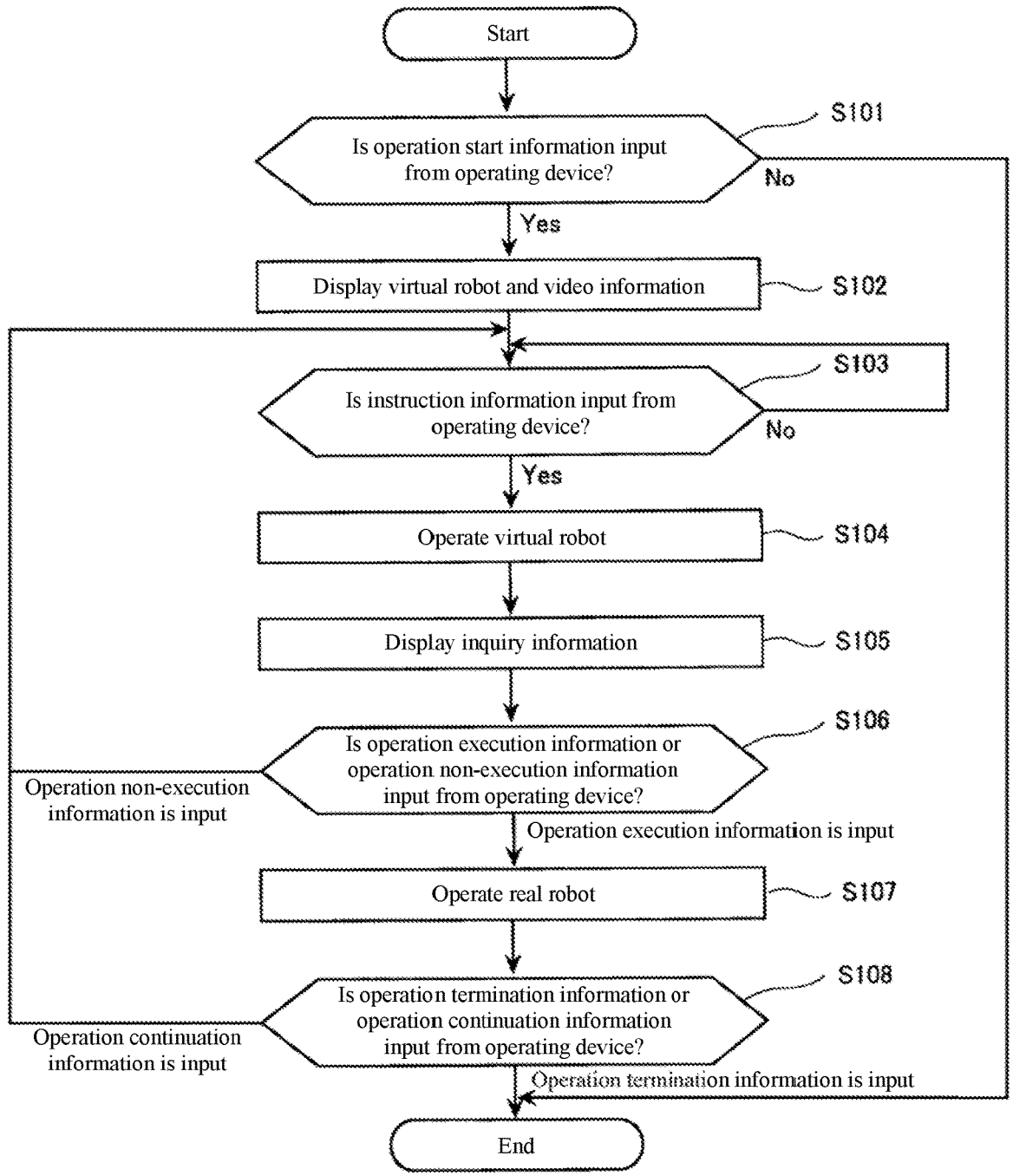

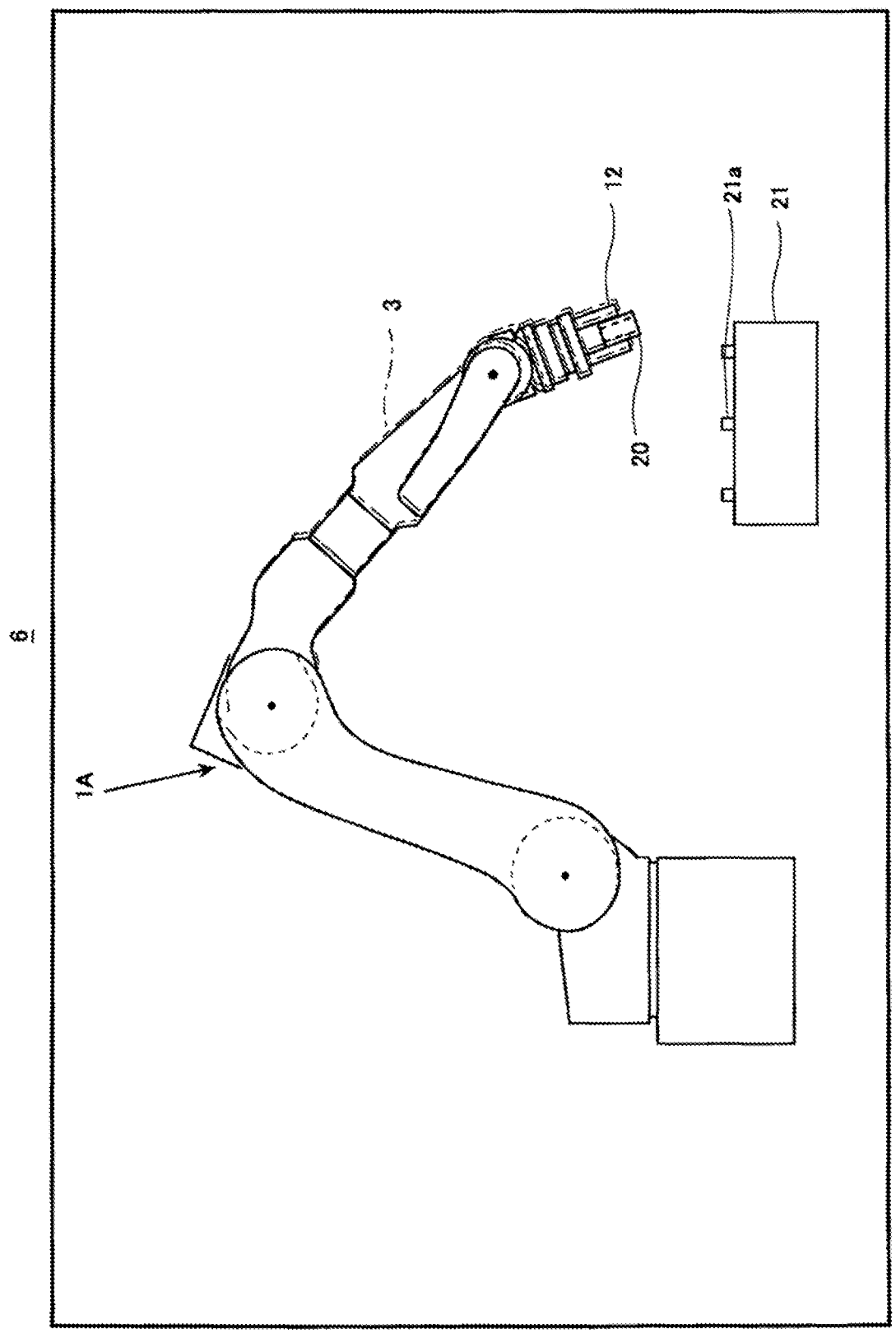
[FIG. 4]

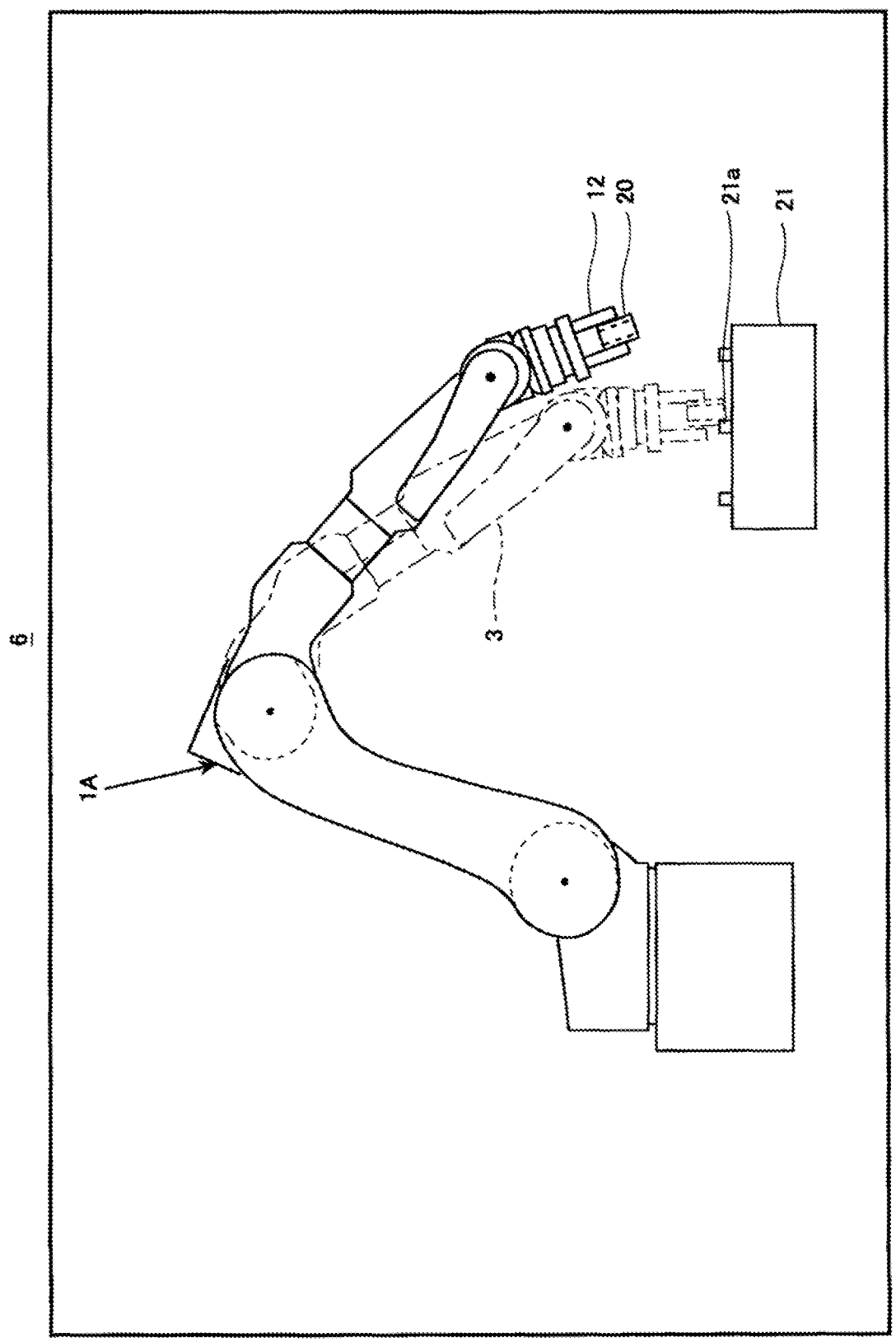
[FIG. 5]

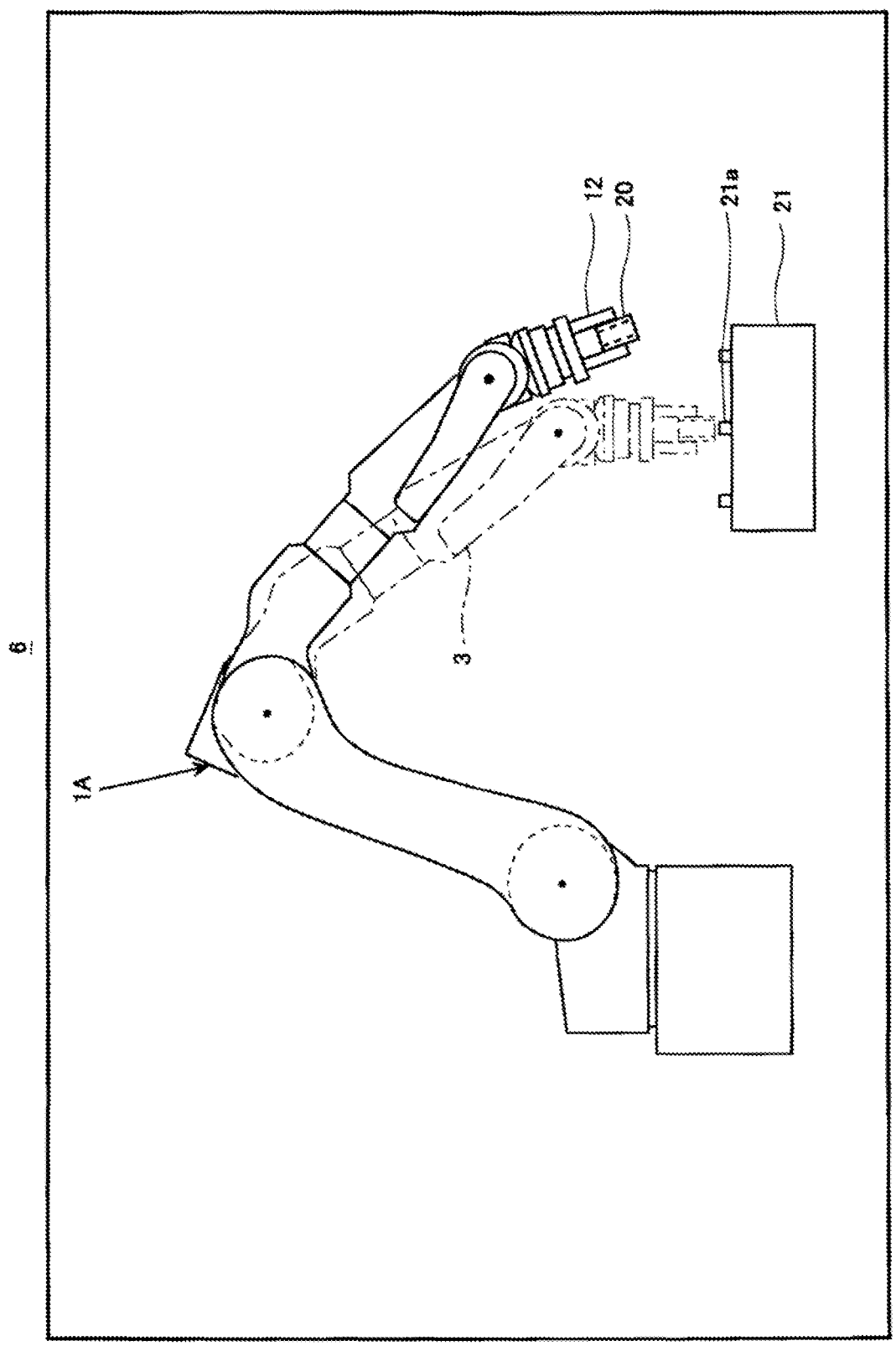
[FIG. 6]

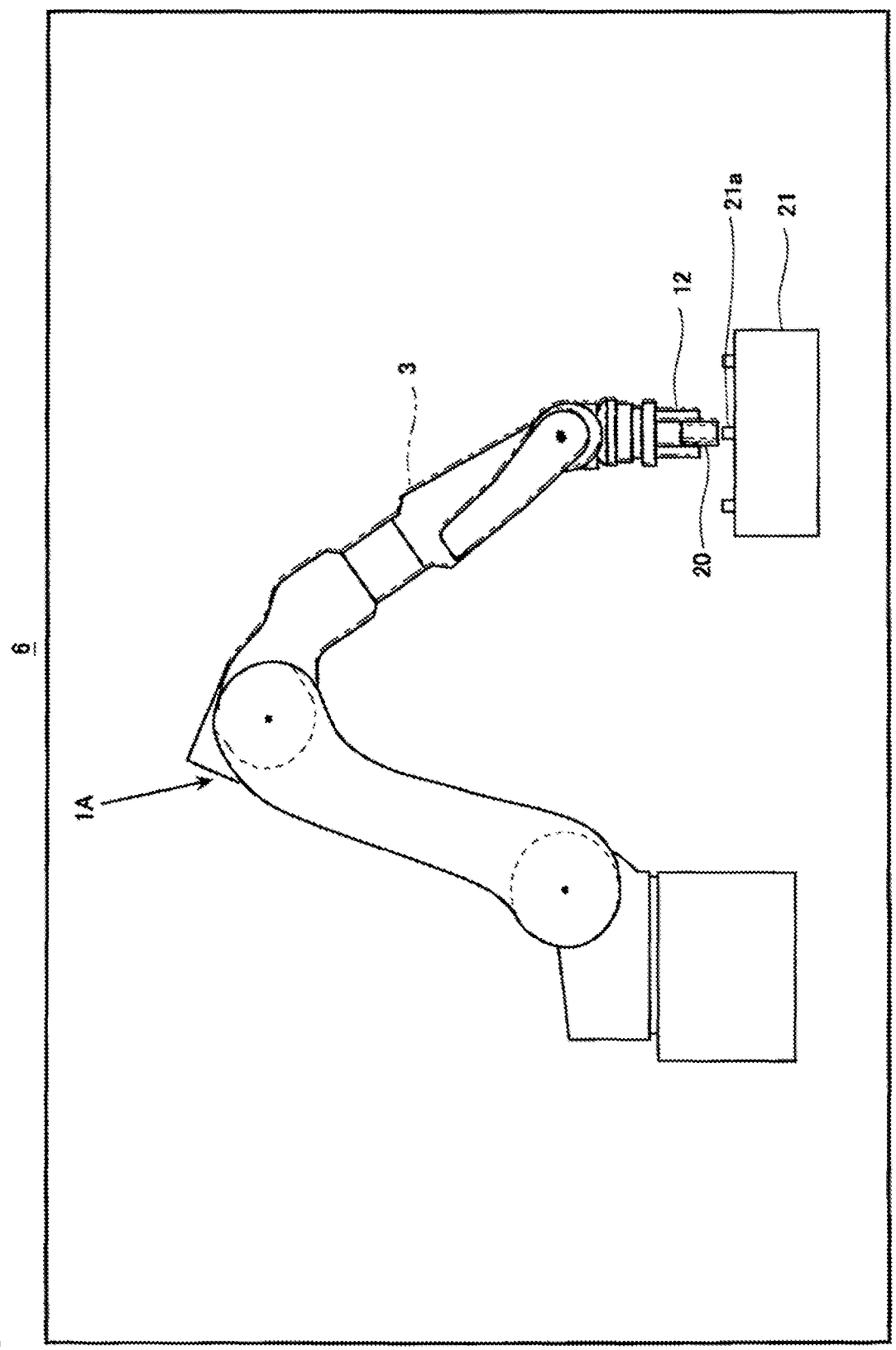
[FIG. 7]

[FIG. 8]
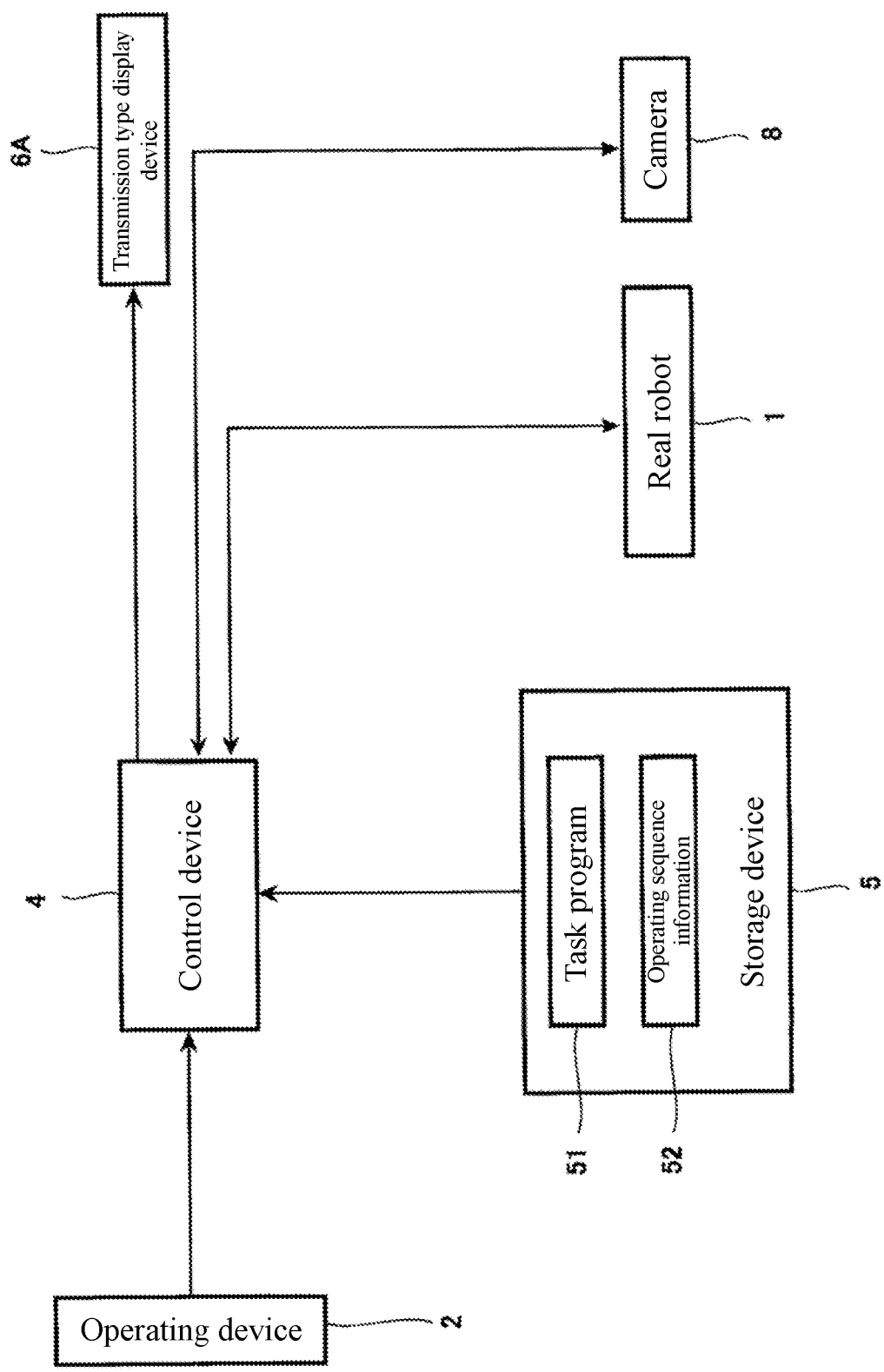

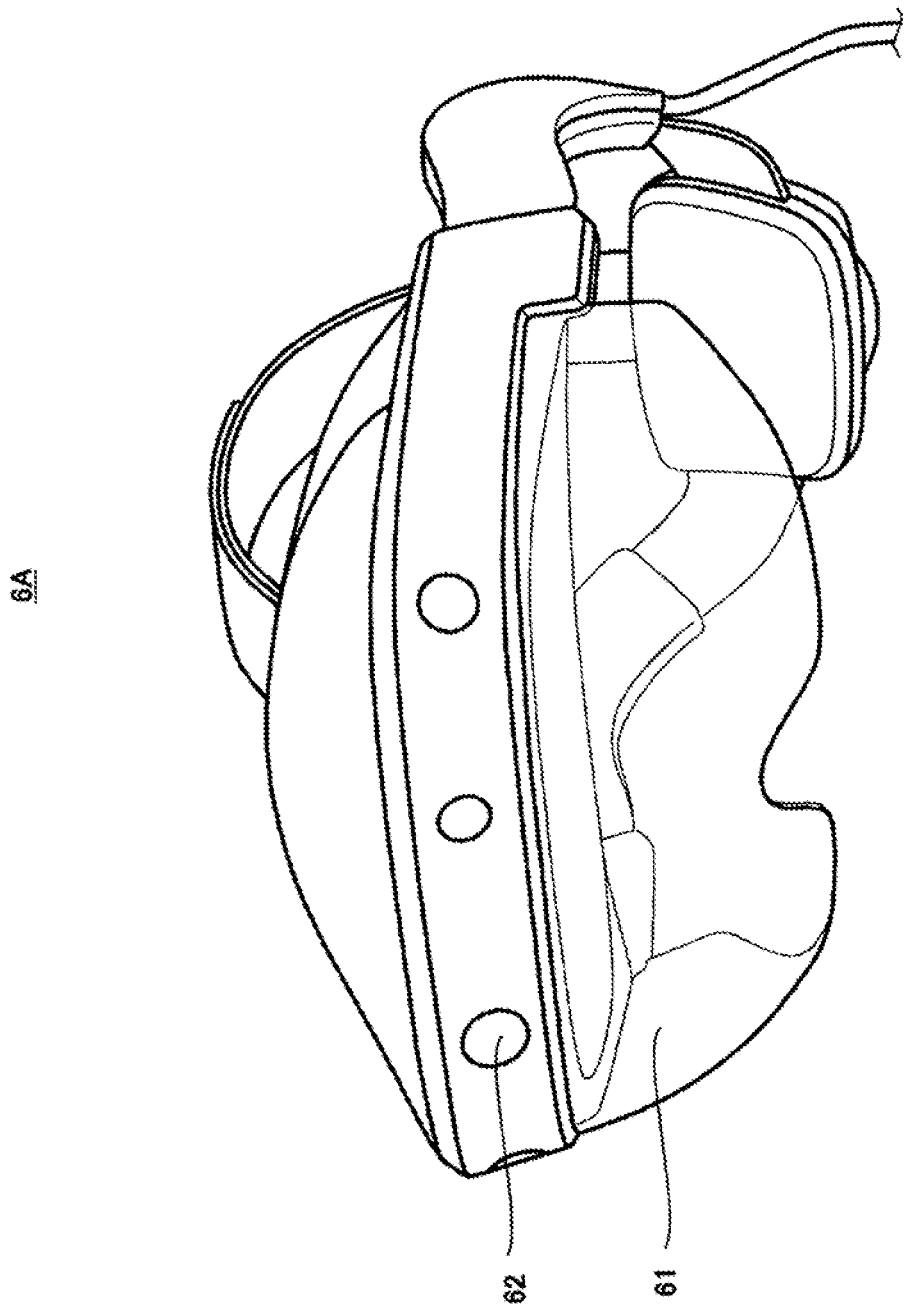
[FIG. 9]

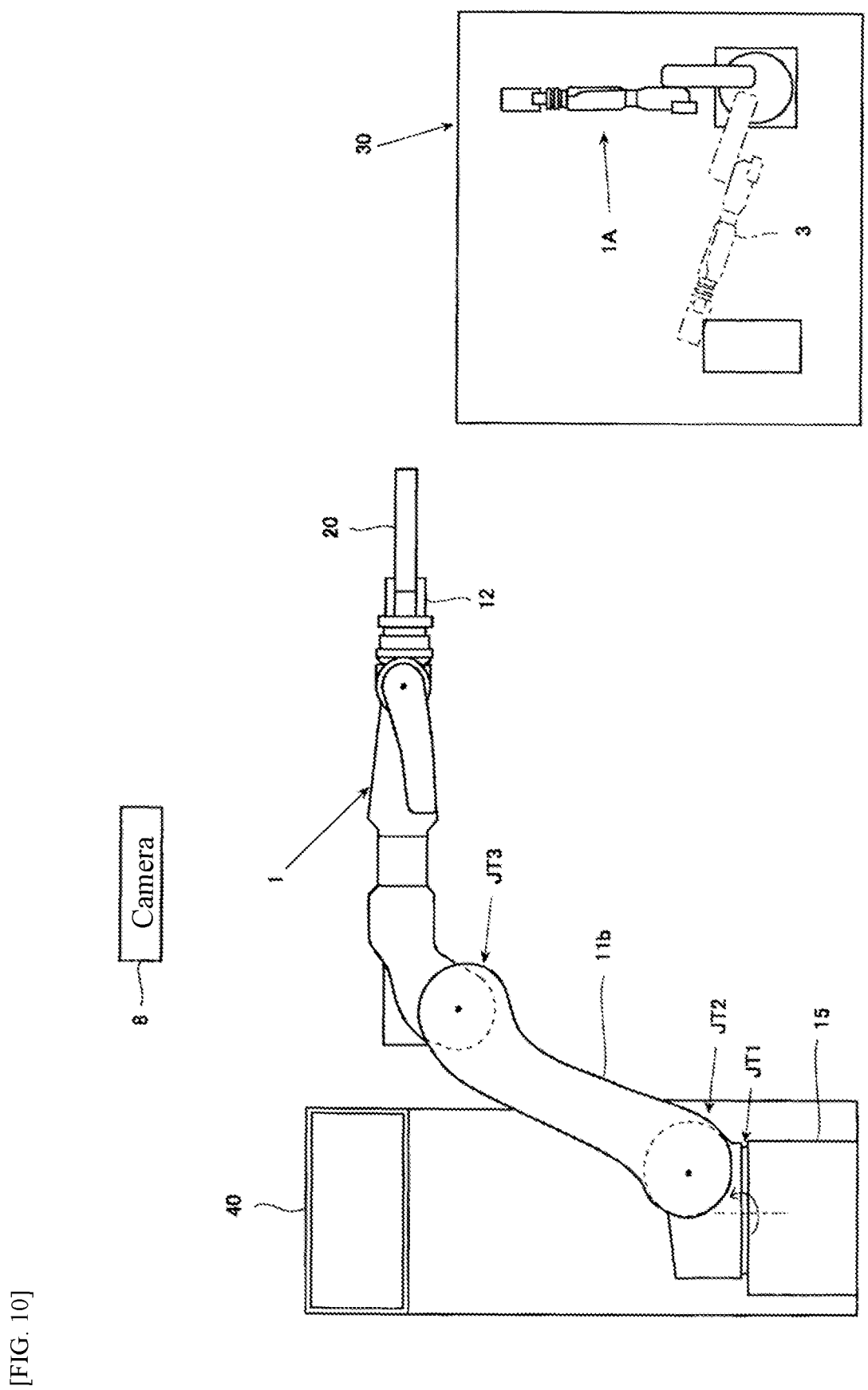
[FIG. 10]

[FIG. 11]
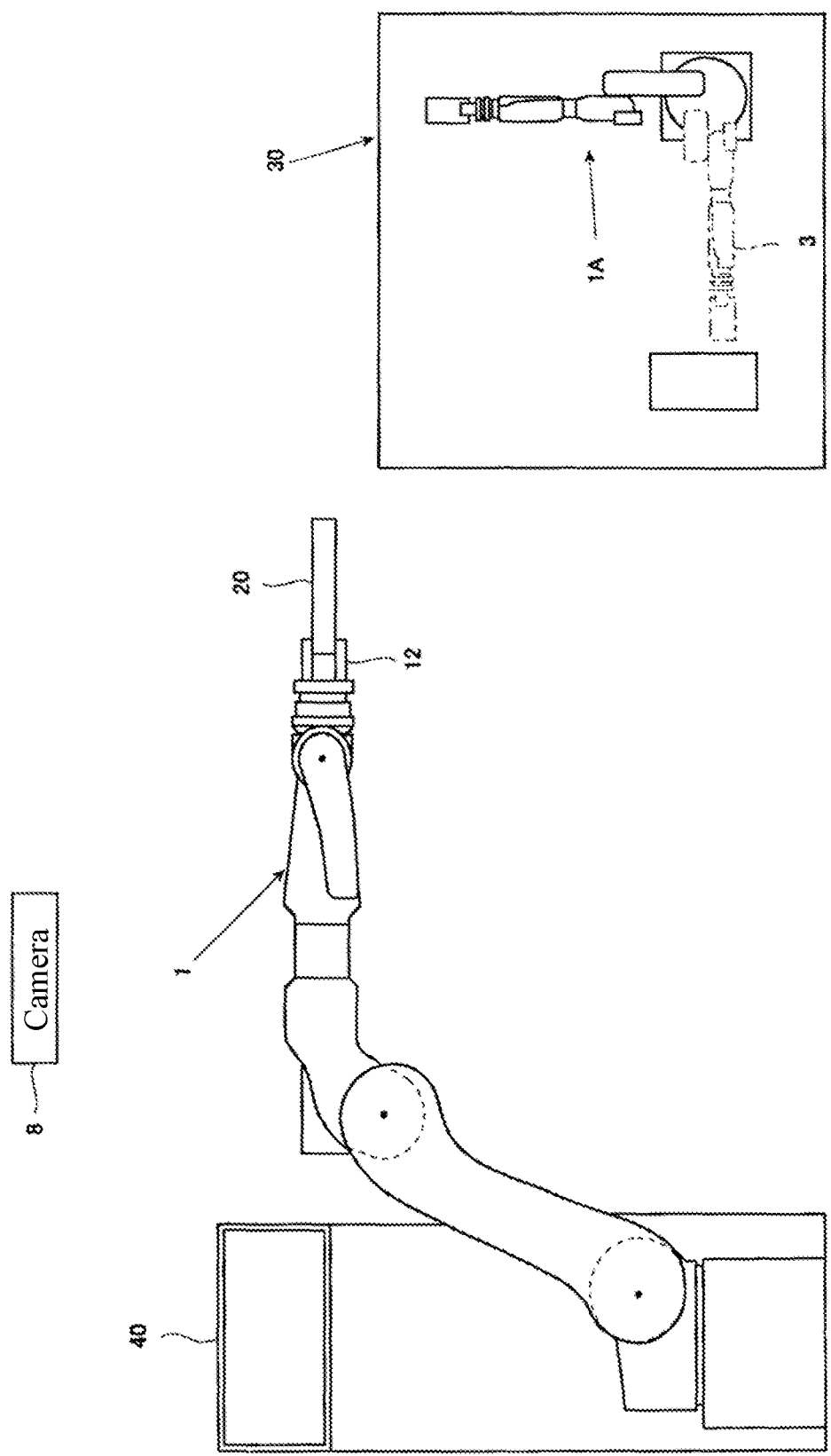

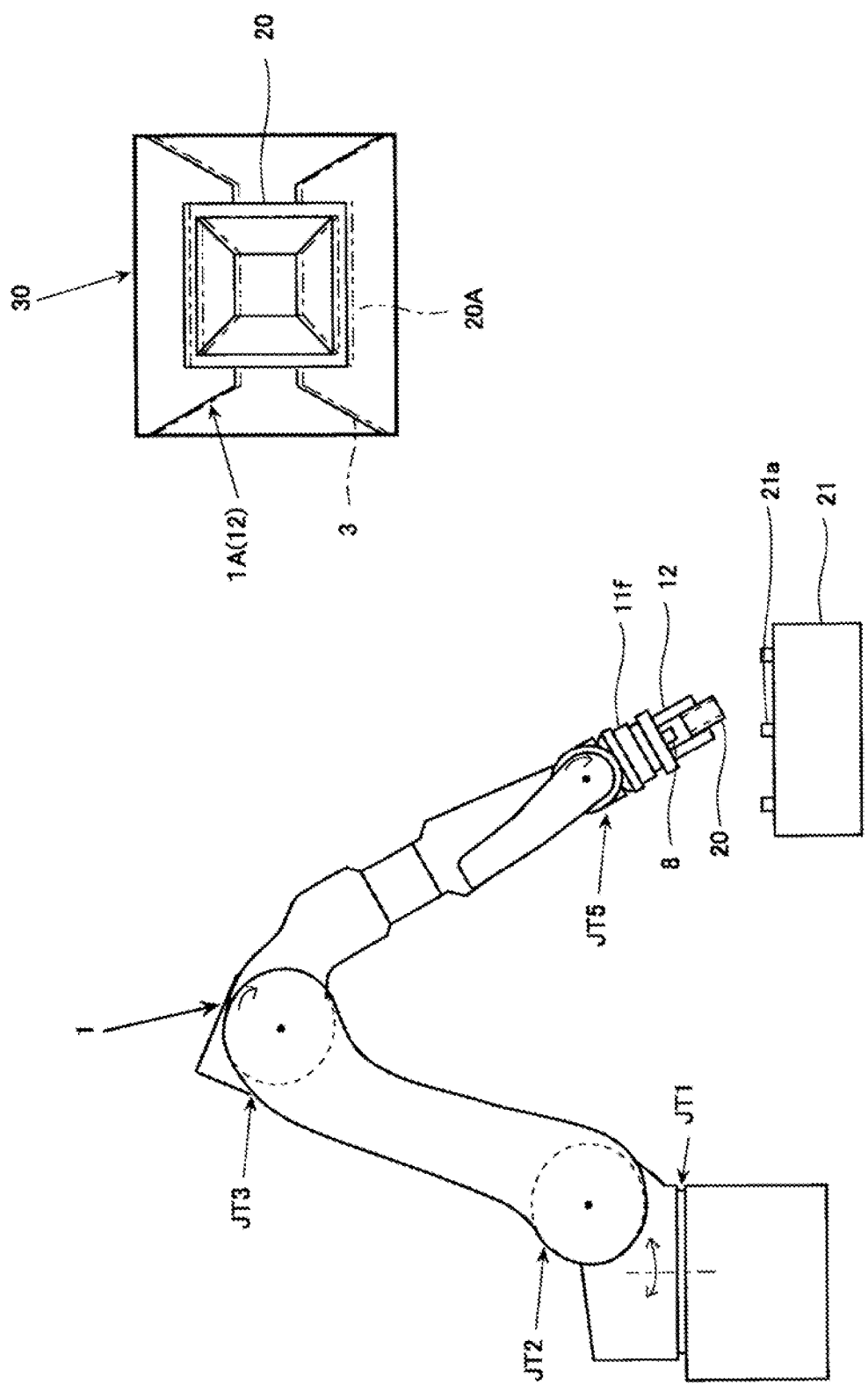
[FIG. 12]

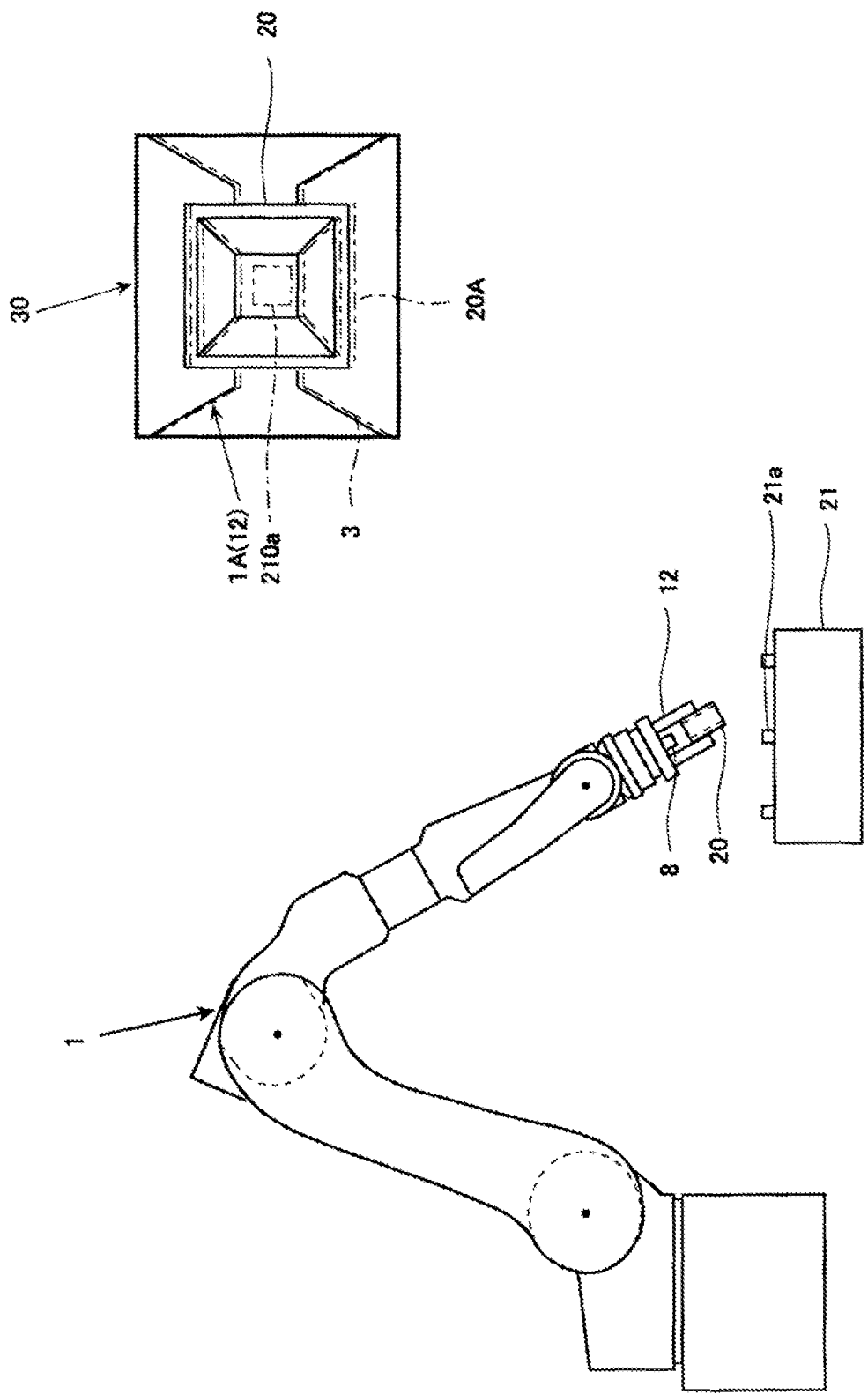
[FIG. 13]

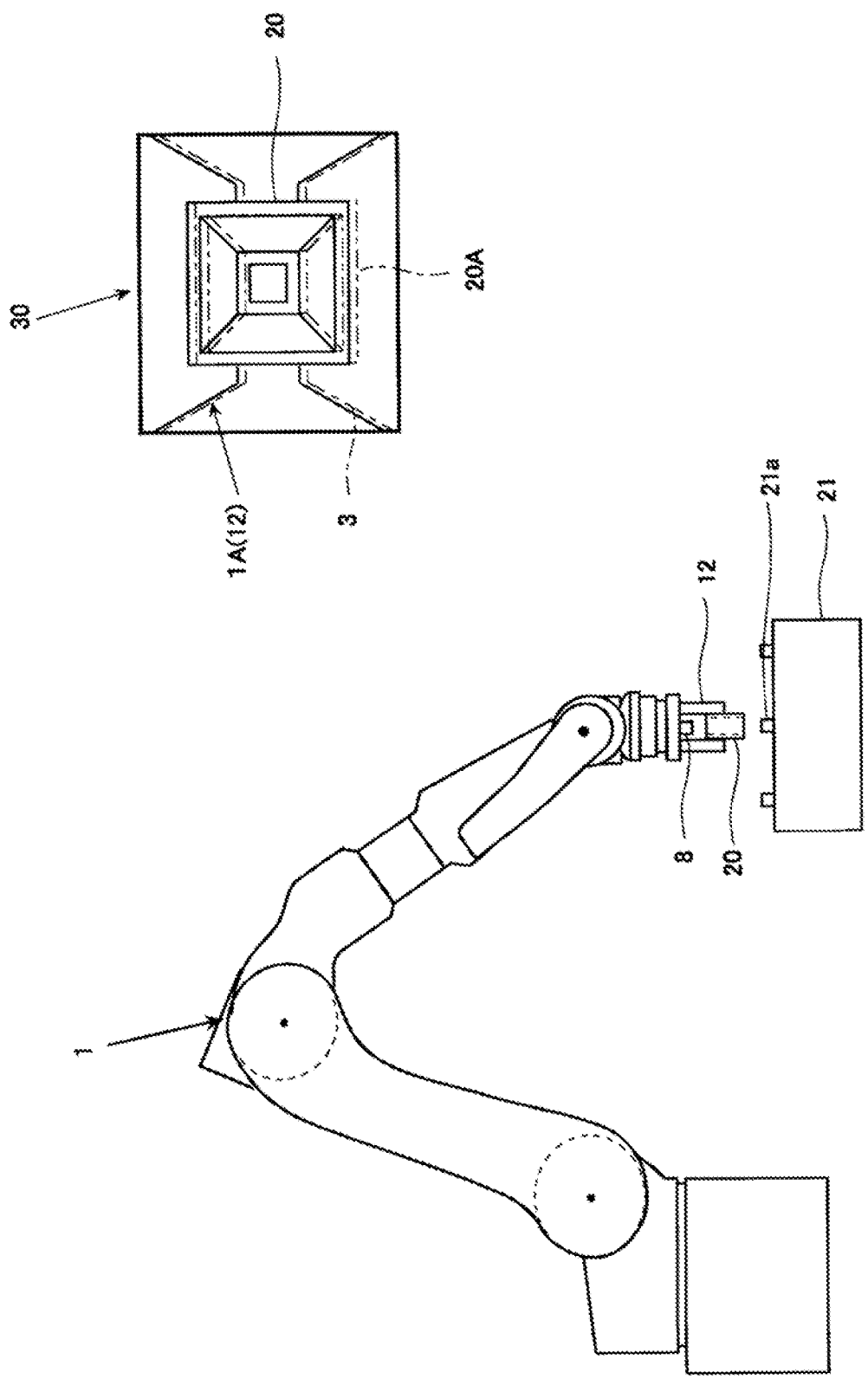
[FIG. 14]

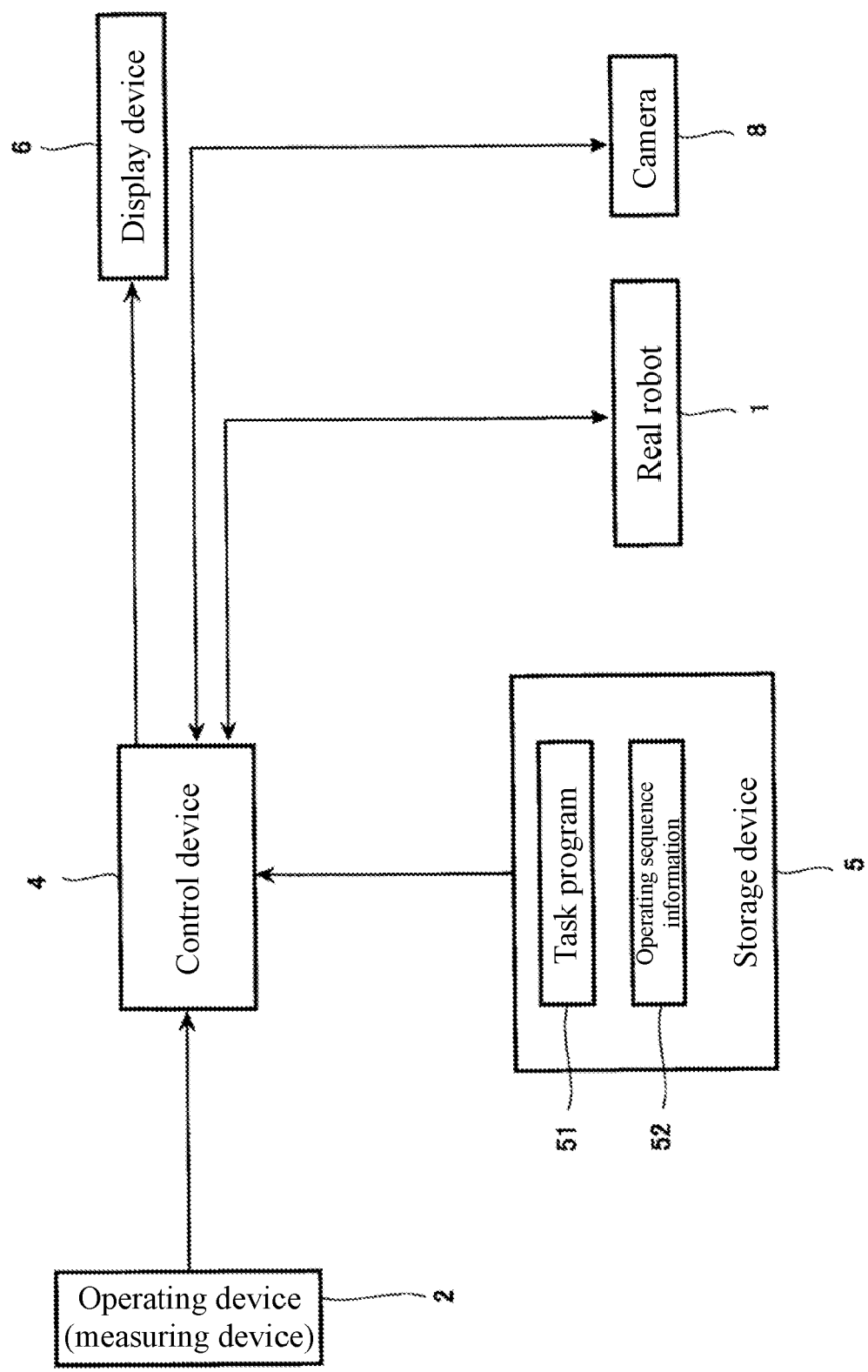
[FIG. 15]

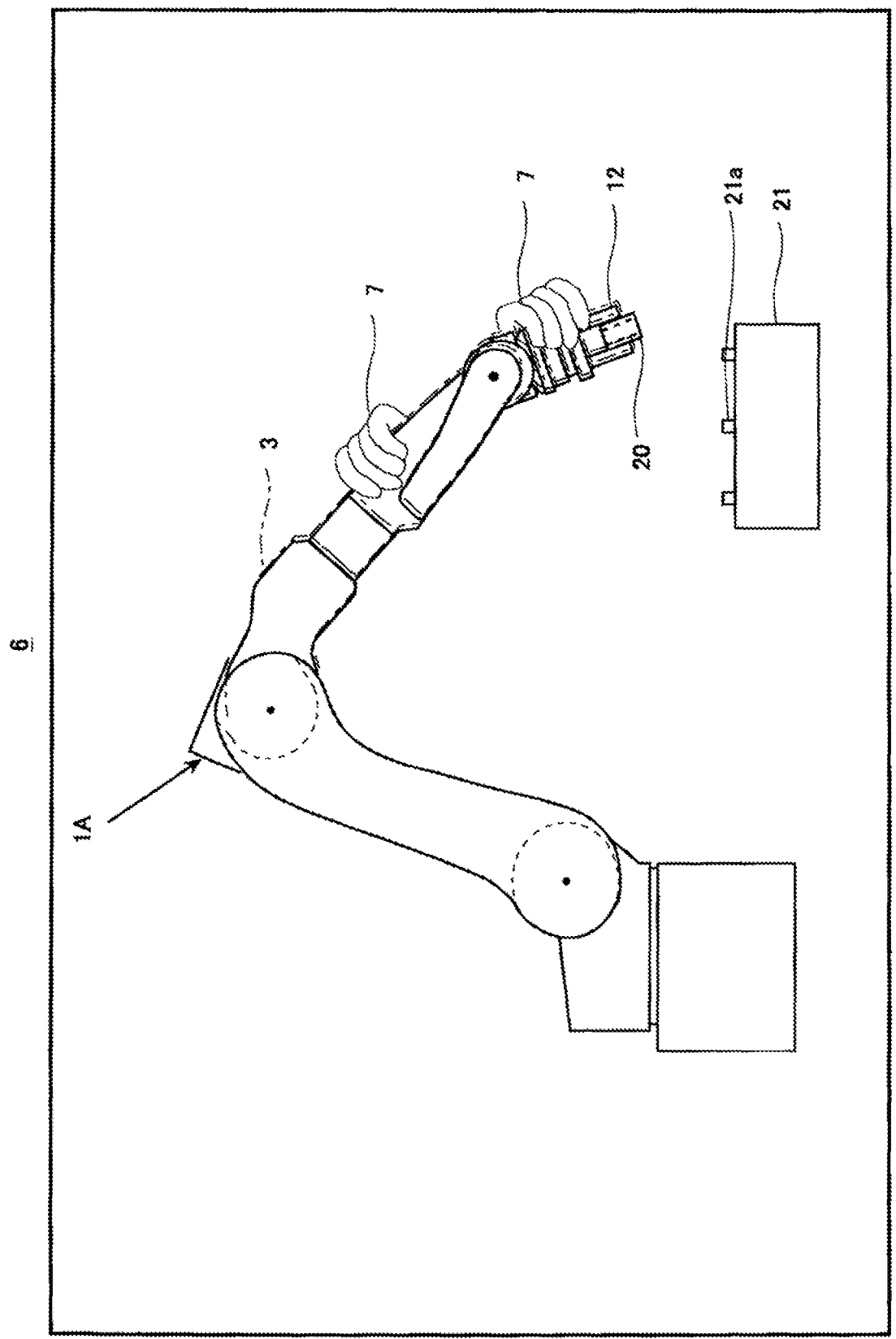
[FIG. 16]

ROBOT SYSTEM AND METHOD FOR OPERATING SAME

TECHNICAL FIELD

The present invention relates to a robot system and a method for operating the same.

BACKGROUND ART

A robot system has been known that provides information about the state of a robot or an operation guide to a user of the robot in an actual image or an actual environment using an augmented reality display (see, for example, PTL 1). In a robot system disclosed in PTL 1, impossibility information that visually indicates the state of the robot or the operation guide is superimposed on the display.

CITATION LIST

Patent Literature

PTL 1: JP 2016-107379 A

SUMMARY OF INVENTION

Technical Problem

Incidentally, when an operator teaches or operates an operation of fitting a held workpiece to a fitting part, it is necessary to carefully position the robot for preventing a contact of the work with other portions, and the like.

In the robot system disclosed in PTL 1 above, an orthogonal coordinate system with a distal end portion of the robot being an origin is displayed. However, this information alone is insufficient to perform positioning, a load on the operator is large, and there has still been room for improvement from the viewpoint of improving work efficiency.

The present invention solves the above-described conventional problems, and an object thereof is to provide a robot system and a method for operating the same that can reduce a load on an operator and improve work efficiency.

Solution to Problem

In order to solve the above-described conventional problems, a robot system according to the present invention includes an operating device that receives an operation instruction from an operator, a real robot that is installed in a work space and performs a series of works constituted of a plurality of steps, a camera configured to image the real robot, a display device configured to display video information of the real robot imaged by the camera and a virtual robot, and a control device, in which in a state that the video information of the real robot imaged by the camera and the virtual robot are displayed on the display device, the control device is configured to operate the virtual robot displayed on the display device based on instruction information input from the operating device, and thereafter operate the real robot in a state that the virtual robot is displayed on the display device when operation execution information to execute an operation of the real robot is input from the operating device.

Thus, since the virtual robot operates based on the instruction information before operation of the real robot, a position after the operation can be visually grasped. Accordingly, for example, it is possible to easily determine whether or not a workpiece held by a real robot body and/or the real robot comes into contact with a device or the like arranged in the work space, and positioning of a distal end of the real robot can be easily performed. Therefore, a load on the operator can be reduced and work efficiency can be improved.

Further, in a method for operating a robot system according to the present invention, the robot system includes an operating device that receives an operation instruction from an operator, a real robot that is installed in a work space and performs a series of works constituted of a plurality of steps, a camera configured to image the real robot, and a display device configured to display video information of the real robot imaged by the camera and a virtual robot, and the method includes (A) displaying, by the display device, the video information of the real robot imaged by the camera and the virtual robot, (B) displaying, by the display device, an operation of the virtual robot based on instruction information input from the operating device, after the (A), and (C) causing the real robot to operate based on the instruction information input from the operating device in a state that the transmission type display device displays the virtual robot when operation execution information to execute an operation of the real robot is input from the operating device, after the (B).

Thus, since the virtual robot operates based on the instruction information before operation of the real robot, a position after the operation can be visually grasped. Accordingly, for example, it is possible to easily determine whether or not a workpiece held by a real robot body and/or the real robot comes into contact with a device or the like arranged in the work space, and positioning of a distal end of the real robot can be easily performed. Therefore, a load on the operator can be reduced and work efficiency can be improved.

Advantageous Effects of Invention

A robot system and a method for operating the same of the present invention are capable of reducing a load on an operator and improving work efficiency.

BRIEF DESCRIPTION OF DRAWINGS

FIG. 1 is a block diagram illustrating a schematic configuration of a robot system according to Embodiment 1.

FIG. 2 is a schematic view illustrating a schematic configuration of a real robot in the robot system illustrated in FIG. 1.

FIG. 3 is a flowchart illustrating an example of operation of the robot system according to Embodiment 1.

FIG. 4 is a schematic view illustrating video information displayed on a display device in the robot system according to Embodiment 1.

FIG. 5 is a schematic view illustrating video information displayed on the display device in the robot system according to Embodiment 1.

FIG. 6 is a schematic view illustrating video information displayed on the display device in the robot system according to Embodiment 1.

FIG. 7 is a schematic view illustrating video information displayed on the display device in the robot system according to Embodiment 1.

FIG. 8 is a block diagram illustrating a schematic configuration of a robot system according to Embodiment 2.

FIG. 9 is a schematic view illustrating an example of a transmission type display device of the robot system illustrated in FIG. 8.

FIG. 10 is a schematic view illustrating a field of view visually recognized by an operator via a transmission type display device in the robot system according to Embodiment 2.

FIG. 11 is a schematic view illustrating the field of view visually recognized by the operator via the transmission type display device in the robot system according to Embodiment 2.

FIG. 12 is a schematic view illustrating a field of view visually recognized by an operator via a transmission type display device in the robot system according to Embodiment 3.

FIG. 13 is a schematic view illustrating the field of view visually recognized by the operator via the transmission type display device in the robot system according to Embodiment 3.

FIG. 14 is a schematic view illustrating the field of view visually recognized by the operator via the transmission type display device in the robot system according to Embodiment 3.

FIG. 15 is a block diagram illustrating a schematic configuration of a robot system according to Embodiment 4.

FIG. 16 is a schematic view illustrating video information displayed on a display device in the robot system according to Embodiment 4.

DESCRIPTION OF EMBODIMENTS

Hereinafter, embodiments of the present invention will be described with reference to the drawings. Note that in all the drawings, the same or corresponding portions are denoted by the same reference numerals, and redundant descriptions are omitted. Moreover, in all the drawings, components for describing the present invention are extracted and illustrated, and illustration may be omitted about any other component. Furthermore, the present invention is not limited to the following embodiments.

Embodiment 1

The robot system according to Embodiment 1 includes an operating device that receives an operation instruction from an operator, a real robot that is installed in a work space and performs a series of works constituted of a plurality of steps, a camera configured to image the real robot, a display device configured to display video information of the real robot imaged by the camera and a virtual robot, and a control device, in which in a state that the video information of the real robot imaged by the camera and the virtual robot are displayed on the display device, the control device is configured to operate the virtual robot displayed on the display device based on instruction information input from the operating device, and thereafter operate the real robot in a state that the virtual robot is displayed on the display device when operation execution information to execute an operation of the real robot is input from the operating device.

Further, in the robot system according to Embodiment 1, the control device may be configured to display the virtual robot and the video information of the real robot imaged by the camera so as to overlap each other on the display device, and operate the virtual robot based on the instruction information when the instruction information is input from the operating device.

Furthermore, in the robot system according to Embodiment 1, the operating device may be constituted of at least one of a mobile terminal, a touch panel, a master arm, a teaching pendant, a joystick, or a voice input device.

Hereinafter, an example of the robot system according to Embodiment 1 will be described with reference to FIGS. 1 to 7.

[Configuration of Robot System]

FIG. 1 is a block diagram illustrating a schematic configuration of the robot system according to Embodiment 1.

As illustrated in FIG. 1, a robot system 100 according to Embodiment 1 includes a real robot 1, an operating device 2, a control device 4, a storage device 5, a display device 6, and a camera 8, and is configured such that the real robot 1 is operated by an operator operating the operating device 2. Further, in the robot system 100 according to Embodiment 1, when the operator operates the operating device 2, the control device 4 is configured to operate a virtual robot 3 (see FIG. 5) displayed on the display device 6, and thereafter execute an operation of the real robot 1 in a state that the virtual robot 3 is displayed on the display device 6 when operation execution information to execute an operation of the real robot 1 is input from the operating device 2.

Hereinafter, each device included in the robot system 100 according to Embodiment 1 will be described.

The real robot 1 is installed in a work space and is configured to perform a series of works constituted of a plurality of steps. Note that as examples of the series of works constituted of a plurality of steps, operations such as assembling of a part to a product and painting can be exemplified.

The real robot 1 according to Embodiment 1 is an articulated robot that is used in a production factory that produces products by assembling electrical or electronic parts, or the like, in a line production system or a cell production system, and disposed along a work table provided in this production factory, and is capable of performing at least one of operations such as transferring, assembling or rearranging parts, changing a posture, or the like with respect to the workpiece on the work table. However, the embodiment of the real robot 1 is not limited to the above, and can be widely applied to an articulated robot regardless of whether it is a horizontal articulated type or a vertical articulated type.

Here, a specific configuration of the real robot 1 will be described with reference to FIG. 2.

FIG. 2 is a schematic view illustrating a schematic configuration of a real robot in the robot system illustrated in FIG. 1.

As illustrated in FIG. 2, the real robot 1 is an articulated robot arm having a connecting body of a plurality of links (here, a first link 11a to a sixth link 11f) and a plurality of joints (here, a first joint JT1 to a sixth joint JT6), and a base 15 that supports these parts.

At the first joint JT1, the base 15 and a proximal end of the first link 11a are connected to be rotatable about an axis extending in a vertical direction. At the second joint JT2, a distal end of the first link 11a and a proximal end of the second link 11b are connected to be rotatable about an axis extending in a horizontal direction. At the third joint JT3, a distal end of the second link 11b and a proximal end of the third link 11c are connected to be rotatable about an axis extending in the horizontal direction.

Further, at the fourth joint JT4, a distal end of the third link 11c and a proximal end of the fourth link 11d are connected to be rotatable about an axis extending in a longitudinal direction of the fourth link 11d. At the fifth joint JT5, a distal end of the fourth link 11d and a proximal end of the fifth link 11e are connected to be rotatable about an axis orthogonal to the longitudinal direction of the fourth link 11d. At the sixth joint JT6, a distal end of the fifth link 11e and a proximal end of the sixth link 11f are connected to be twistable and rotatable.

A mechanical interface is provided at a distal end of the sixth link 11f. An end effector 12 corresponding to a work content is detachably attached to the mechanical interface.

Further, the first joint JT1 to the sixth joint JT6 are each provided with a drive motor (not illustrated) as an example of an actuator that relatively rotates two members which the joint connects. The drive motor may be, for example, a servo motor servo-controlled by the control device 4. Further, each of the first joint JT1 to the sixth joint JT6 is provided with a rotation sensor that detects a rotational position of the drive motor and a current sensor that detects a current that controls rotation of the drive motor (both sensors are not illustrated). The rotation sensor may be an encoder, for example.

The operating device 2 is a device that receives an operation instruction from the operator. Examples of the operating device 2 include a mobile terminal, a touch panel, a master arm, a teaching pendant, a joystick, or a voice input device. Examples of the mobile terminal include a tablet, a smartphone, a laptop computer, and the like. Further, the operating device 2 may include a switching device (for example, a button or the like) for switching display and non-display of the virtual robot 3 on the display device 6.

The storage device 5 is a readable-writable recording medium, and stores a task program 51 and operating sequence information 52 of the robot system 100. Note that in the robot system 100 according to Embodiment 1, the storage device 5 is provided separately from the control device 4, but may be provided integrally with the control device 4.

The task program 51 is created by, for example, teaching by the operator using the operating device 2 constituted of a teaching pendant or the like, and is associated with identification information and a task of the real robot 1 and stored in the storage device 5. Note that the task program 51 may be created as an operation flow for each work.

The operating sequence information 52 is information related to an operating sequence that defines a series of work steps performed by the real robot 1 in the work space. In the operating sequence information 52, an operation order of work steps and a control mode of the real robot 1 are associated with each other. Further, in the operating sequence information 52, a task program for causing the real robot 1 to automatically execute a work is associated with each work step. Note that the operating sequence information 52 may include a program for causing the real robot 1 to automatically execute a work for each work step.

Further, in Embodiment 1, a camera 8 is disposed in the work space. Specifically, the camera 8 is disposed on a wall surface (side wall surface) constituting the work space. The camera 8 is configured to output video information including the imaged real robot 1 to the control device 4. Note that the camera 8 may not be disposed in the work space. For example, the camera 8 may be a camera installed on a portable terminal or a head mounted display carried by the operator.

The control device 4 controls operation of the real robot 1. The control device 4 includes, for example, an arithmetic unit (not illustrated) constituted of a microcontroller, MPU, a programmable logic controller (PLC), a logic circuit, or the like, and a memory unit (not illustrated) constituted of a ROM, a RAM, and/or the like. Further, each functional block included in the control device 4 can be implemented by an arithmetic unit of the control device 4 reading and executing a program stored in the memory unit (storage) or the storage device 5.

Note that the control device 4 may be not only in a mode to be constituted of a single control device, but also in a mode to be constituted of a control device group that controls the real robot 1 (robot system 100) by a plurality of control devices in cooperation.

Further, the control device 4 may display the virtual robot 3 on the display device 6 using data indicating a three-dimensional model of the real robot 1 created in advance by three-dimensional CAD. Further, the control device 4 may display the virtual robot 3 on the display device 6 using image data obtained by scanning the real robot 1 with a three-dimensional scanner or the like.

The display device 6 is configured to display an image (video information) imaged by the camera 8 installed in the work space (for example, on a ceiling, a side wall surface, a distal end of the real robot 1, or the like) and video information output from the control device 4 (for example, the virtual robot 3). The display device 6 may be constituted of a stationary display that is used by being placed on a desk, a floor, or the like. Further, the display device 6 may be a transmission type display device configured to allow the operator to visually recognize a physical real world. Note that in Embodiment 1, the display device 6 is constituted of a stationary display.

[Operations and Effects of Robot System]

Next, operations and effects of the robot system 100 according to Embodiment 1 will be described with reference to FIGS. 1 to 7. Note that the following operations are executed by the arithmetic unit of the control device 4 reading a program stored in the memory unit or the storage device 5. Further, in the following, as illustrated in FIGS. 4 to 7, as a specific example of operation of the robot system 100 according to Embodiment 1, an operation of fitting a cylindrical workpiece 20 held by the real robot 1 onto a protrusion 21a provided on a base 21 will be described.

FIG. 3 is a flowchart illustrating an example of operation of the robot system according to Embodiment 1. FIGS. 4 to 7 are schematic views illustrating video information displayed on the display device in the robot system according to Embodiment 1.

Note that in FIGS. 4 and 7, the virtual robot 3 and a virtual workpiece are indicated by dot and dash lines, and the virtual robot 3 is displayed so as to be shifted from video information 1A of the real robot 1 so that the video information 1A of the real robot 1 and the virtual robot 3 can be easily seen.

As illustrated in FIG. 3, the control device 4 determines whether or not operation start information (operation start signal) indicating that operation of the real robot 1 is started is input from the operating device 2 (step S101).

When the control device 4 determines that the operation start information is not input from the operating device 2 (No in step S101), the control device 4 terminates the program. Note that when the program is terminated, the control device 4 executes the program again after 50 msec, for example. On the other hand, when it is determined that the operation start information is input from the operating device 2 (Yes in step S101), the control device 4 executes the process of step S102.

In step S102, the control device 4 causes the display device 6 to display the virtual robot 3, the virtual workpiece, and the video information 1A including the real robot 1 imaged by the camera 8. At this time, the control device 4 may cause the display device 6 to display a virtual workpiece corresponding to the workpiece 20 held by the real robot 1. Further, the control device 4 may cause the display device 6 to display the virtual robot 3 so that the virtual robot 3 overlaps the real robot 1 visually recognized by the operator.

Note that the control device 4 may cause the display device 6 to display the virtual robot 3 so that the virtual robot 3 completely overlaps the real robot 1, may cause the display device 6 to display the virtual robot 3 so that the virtual robot 3 and the real robot 1 are slightly shifted, or may cause the display device 6 to display the virtual robot 3 so that the virtual robot 3 does not overlap the real robot 1 at all.

Next, the control device 4 determines whether or not the instruction information to the real robot 1 is input from the operating device 2 (step S103). Here, the instruction information includes, for example, position coordinates of the distal end of the real robot 1, a rotation angle of each axis constituting the real robot 1, and the like.

When it is determined that the instruction information is input from the operating device 2 (Yes in step S103), the control device 4 operates the virtual robot 3 displayed on the display device 6 based on the instruction information input in step S103 (step S104). Then, the control device 4 causes the display device 6 to display inquiry information for asking the operator whether or not to operate the real robot 1 (step S105). Examples of the inquiry information include text information such as "Do you want to operate the real robot 1?"

Next, the control device 4 determines whether operation execution information indicating to execute operation of the real robot 1 or operation non-execution information indicating not to execute operation of the real robot 1 is input from the operating device 2 (step S106).

Here, as illustrated in FIG. 5, it is assumed that as a result of operating the virtual robot 3 displayed on the display device 6 based on the instruction information input in step S103, the cylindrical workpiece 20 collides with the protrusion 21a. In such a case, the operator can easily understand that the cylindrical workpiece 20 collides with the protrusion 21a when the real robot 1 is actually operated according to the instruction information input in step S103.

Accordingly, the operator operates the operating device 2 so that the real robot 1 does not operate based on the instruction information input in step S103. In this manner, the operation non-execution information is input to the control device 4 from the operating device 2 (operation is not executed in step S106), the control device 4 returns to step S103, instruction information is input again from the operating device 2 (step S103), and the processes of step S103 to step S106 such as operating the virtual robot 3 (step S104) are repeated.

On the other hand, as illustrated in FIG. 6, it is assumed that as a result of operating the virtual robot 3 displayed on the display device 6 based on the instruction information input in step S103, the cylindrical workpiece 20 is positioned above (right above) the protrusion 21a. In such a case, the operator can easily understand that no problem occurs when the real robot 1 is actually operated according to the instruction information input in step S103.

Accordingly, the operator operates the operating device 2 so that the real robot 1 operates based on the instruction information input in step S103. Thus, the operation execution information is input to the control device 4 from the operating device 2 (operation execution is performed in step S106), and the control device 4 operates the real robot 1 based on the instruction information that the real robot 1 is input in step S103 (step S107). As a result, as illustrated in FIG. 7, the real robot 1 operates so that the cylindrical workpiece 20 is positioned above (right above) the protrusion 21a.

Next, the control device 4 determines whether operation continuation information indicating to continue the operation of the real robot 1 is input from the operating device 2 or operation termination information indicating to terminate the operation of the real robot 1 is input from the operating device 2 (step S108).

When it is determined that the operation continuation information is input from the operating device 2 (the operation continuation information is input in step S108), the control device 4 performs the respective processes of steps S103 to S108 until it is determined that the operation termination information is input. On the other hand, when it is determined that the operation termination information is input from the operating device 2 (the operation termination information is input in step S108), the control device 4 terminates the program.

Note that in Embodiment 1, although a mode is employed in which the control device 4 causes the display device 6 to display the virtual robot 3 and the video information 1A including the real robot 1 imaged by the camera 8 in step S102, the embodiment is not limited thereto. The control device 4 may employ a mode in which the display device 6 displays the video information 1A including the real robot 1 imaged by the camera 8 before starting this program or immediately after starting this program.

In the robot system 100 according to Embodiment 1 configured as described above, when the instruction information is input from the operating device 2, the control device 4 operates the virtual robot 3 displayed on the display device 6 before operating the real robot 1. Thus, when the real robot 1 operates based on the input instruction information, the operator can easily understand a post-operation state of the real robot 1, and can easily understand whether a contact or the like of the real robot 1 with a device or the like disposed in the work space occurs or not.

Thus, the operator no longer need to operate (manipulate) the real robot 1 little by little so that a contact or the like with a device or the like disposed in the work space does not occur. Thus, a work load of the operator can be reduced, and work efficiency can be improved.

Embodiment 2

In a robot system according to Embodiment 2, in the robot system according to Embodiment 1, the display device is constituted of a transmission type display device configured to allow an operator to visually recognize a real world.

Further, in the robot system according to Embodiment 2, the display device may be configured to be wearable by the operator.

Hereinafter, an example of the robot system according to Embodiment 2 will be described with reference to FIGS. 8 to 11.

[Configuration of Robot System]

FIG. 8 is a block diagram illustrating a schematic configuration of the robot system according to Embodiment 2. FIG. 9 is a schematic view illustrating an example of a transmission type display device of the robot system illustrated in FIG. 8. FIGS. 10 and 11 are schematic views illustrating a field of view visually recognized by the operator via the transmission type display device in the robot system according to Embodiment 2.

As illustrated in FIG. 8, the robot system 100 according to Embodiment 2 has a same basic configuration as the robot system 100 according to Embodiment 1, but is different in that the display device 6 is constituted of a transmission type display device 6A that is configured to allow the operator to visually recognize a physical real world.

As illustrated in FIG. 9, the transmission type display device 6A may be constituted of a head-mounted display or a pair of glasses that has a display unit 61 for projecting video information output from the control device 4, and is worn and used by the operator. Further, as illustrated in FIG. 9, the transmission type display device 6A may be provided with a camera 62 that obtains information on the real world that is visually recognized by the operator. Note that the camera 62 provided in the transmission type display device 6A may function as the camera 8.

Further, as illustrated in FIGS. 10 and 11, on the display unit 61 of the transmission type display device 6A, the video information 1A including the real robot 1 imaged by the camera 8 and the virtual robot 3 are displayed as a video screen 30.

[Operations and Effects of Robot System]

First, as illustrated in FIGS. 10 and 11, in the work space where the real robot 1 is disposed, a container 40 that is open on a front side is arranged behind the base 15 of the real robot 1. Further, the camera 8 is disposed on a ceiling that constitutes the work space.

In such a state, hereinafter, as a specific example of operation of the robot system 100 according to Embodiment 2, an operation of carrying a plate-like workpiece 20 held by the real robot 1 into a housing 40 will be described.

Note that the following operations are executed by the arithmetic unit of the control device 4 reading out a program stored in the memory unit or the storage device 5, and since contents of the program read out by the arithmetic unit of the control device 4 are the same as those of the robot system 100 according to Embodiment 1, description of the flow thereof will be omitted.

First, it is assumed that the operator inputs instruction information (hereinafter also referred to as first instruction information) for rotating the first joint JT1 about the axis thereof by operating the operating device 2. Then, the control device 4 operates the virtual robot 3 according to the input first instruction information, but the workpiece 20 held by the real robot 1 collides with the container 40 as illustrated in FIG. 10.

Thus, the operator can easily understand that the workpiece 20 collides with the container 40 when the real robot 1 is actually operated based on the first instruction information. Further, in order to avoid a collision of the workpiece 20 with the container 40, the operator can easily understand that it is necessary to make a distance (in the horizontal direction) between the base 15 and the workpiece 20 smaller than a distance (in the horizontal direction) between the base 15 and the container 40. Then, in order to make the distance between the base 15 and the workpiece 20 smaller, the operator can easily understand that it is necessary to operate the second joint JT2 to rotate about the axis thereof so that the second link 11b becomes substantially parallel to the vertical direction.

Thus, the operator operates the operating device 2 and inputs instruction information (hereinafter also referred to as second instruction information) to the control device 4 so as to rotate the first joint JT1 about the axis thereof and rotate the second joint JT2 about the axis thereof. Then, when the control device 4 operates the virtual robot 3 according to the input second instruction information, as illustrated in FIG. 11, the workpiece 20 held by the real robot 1 is located in front of the container 40 without colliding with the container 40.

Based on this result, the operator operates the operating device 2 and inputs operation execution information to the control device 4 so that the real robot 1 operates based on the second instruction information. The control device 4 operates the real robot 1 based on the second instruction information in a state that the virtual robot 3 is displayed on the video screen 30.

The robot system 100 according to Embodiment 2 configured as described above also has similar effects to those of the robot system 100 according to Embodiment 1.

Embodiment 3

In the robot system according to Embodiment 3, in the robot system according to Embodiment 1 or 2, a camera is disposed at a distal end of the real robot.

Hereinafter, an example of the robot system according to Embodiment 3 will be described with reference to FIGS. 12 to 14.

[Configuration of Robot System]

FIGS. 12 to 14 are schematic views illustrating a field of view visually recognized by an operator via a transmission type display device in the robot system according to Embodiment 3. Note that in FIGS. 12 to 14, the virtual robot 3 and the virtual workpiece 20 are indicated by dot and dash lines, and the virtual robot 3 is displayed so as to be shifted from the real robot 1 so that the real robot 1 and the virtual robot 3 can be easily seen.

As illustrated in FIGS. 12 to 14, the robot system 100 according to Embodiment 3 has a same basic configuration as the robot system 100 according to Embodiment 1, but differs in that the camera 8 is disposed at the distal end (sixth link 11f) of the real robot 1.

Further, in Embodiment 3, the transmission type display device 6A is used as the display device 6. The transmission type display device 6A may be constituted of a head-mounted display or a pair of glasses worn and used by the operator, or may be a stationary display. Note that the display device 6 may be a stationary display that is not a transmission type.

[Operations and Effects of Robot System]

Next, operations and effects of the robot system 100 according to Embodiment 3 will be described with reference to FIGS. 12 to 14.

Note that the following operations are executed by the arithmetic unit of the control device 4 reading out a program stored in the memory unit or the storage device 5, and since contents of the program read out by the arithmetic unit of the control device 4 are the same as those of the robot system 100 according to Embodiment 1, description of the flow thereof will be omitted.

Further, in the following, as illustrated in FIGS. 12 to 14, as a specific example of operation of the robot system 100 according to Embodiment 3, an operation of fitting a cylindrical workpiece 20 held by the real robot 1 onto a protrusion 21a provided on a base 21 will be described, similarly to the operation of the robot system 100 according to Embodiment 1.

First, as illustrated in FIG. 12, in the display unit 61 of the transmission type display device 6A, video information 1A including the end effector 12 of the real robot 1 and the workpiece 20 imaged by the camera 8, the virtual robot 3, and a virtual workpiece 20A held by the virtual robot 3 are displayed on the video screen 30. Note that FIG. 12 illustrates a state that the workpiece 20 is not positioned above the protrusion 21a.

The operator operates the operating device 2 to input instruction information (hereinafter also referred to as third instruction information) to the control device 4 so as to rotate the first joints JT1 to JT5 about the axes thereof so that the workpiece 20 is positioned above the protrusion 21a. Then, the control device 4 operates the virtual robot 3 displayed on the video screen 30 based on the third instruction information. A result thereof is illustrated in FIG. 13.

As illustrated in FIG. 13, the operator can easily understand that the virtual workpiece 20A is positioned above a virtual protrusion 210a as a result of operating the virtual robot 3 based on the third instruction information.

Accordingly, the operator operates the operating device 2 and inputs operation execution information to the control device 4 so that the real robot 1 operates based on the third instruction information. Then, as illustrated in FIG. 14, the control device 4 operates the real robot 1 based on the third instruction information in a state that the virtual robot 3 is displayed on the video screen 30.

The robot system 100 according to Embodiment 3 configured as described above also has similar effects to those of the robot system 100 according to Embodiment 1.

Embodiment 4

A robot system according to Embodiment 4 is such that, in the robot system according to any one of Embodiments 1 to 3, the operating device is constituted of a measuring device that measures movement of a hand of the operator, and the control device is configured to display a virtual hand on the display device so as to correspond to movement of the hand of the operator measured by the measuring device.

Hereinafter, an example of the robot system according to Embodiment 4 will be described with reference to FIGS. 15 and 16.

[Configuration of Robot System]

FIG. 15 is a block diagram illustrating a schematic configuration of the robot system according to Embodiment 4. FIG. 16 is a schematic view illustrating video information displayed on the display device in the robot system according to Embodiment 4.

As illustrated in FIG. 15, the robot system 100 according to Embodiment 4 has a same basic configuration as the robot system 100 according to Embodiment 1, but differs in that the operating device 2 is constituted of a measuring device that measures movement of a hand of the operator. The measuring device that measures movement of the hand of the operator may be a glove (data glove) provided with various sensors (for example, an acceleration sensor and a gyro sensor), or may be a device such as Leap Mortion in which a sensor such as an infrared sensor is attached to the operator, and the sensor measures movement of the hand of the operator.

Further, as illustrated in FIG. 16, in the robot system 100 according to Embodiment 4, the control device 4 is configured to display a virtual hand 7 on the display device 6 so as to correspond to movement of the hand of the operator measured by the measuring device. Thus, the operator can hold and move (direct teach) the virtual robot 3 with the virtual hand 7.

The robot system 100 according to Embodiment 4 configured as described above also has similar effects to those of the robot system 100 according to Embodiment 1.

From the above description, many improvements and other embodiments of the present invention will be apparent to those skilled in the art. Therefore, the above description should be taken as exemplary only, and is provided for the purpose of teaching those skilled in the art the best mode for carrying out the present invention. The structural and/or functional details of the present invention may be substantially changed without departing from the spirit of the present invention.

INDUSTRIAL APPLICABILITY

A robot system and a method for operating the same of the present invention is capable of reducing a load on an operator and improving work efficiency, and thus are useful in the field of robots.

REFERENCE SIGNS LIST 1 real robot
1A video information
2 operating device
3 virtual robot
4 control device
5 storage device
6 display device
6A transmission type display device
8 camera
11a first link
11b second link
11c third link
11d fourth link
11e fifth link
11f sixth link
12 end effector
15 base
20 workpiece
20A virtual workpiece
21 base
21a protrusion
30 video screen
40 container
51 task program
52 operating sequence information
61 display unit
62 camera
100 robot system
210a virtual protrusion
JT1 first joint
JT2 second joint
JT3 third joint
JT4 fourth joint
JT5 fifth joint
JT6 sixth joint

The invention claimed is:
1. A robot system comprising:
an operating device that receives an operation instruction from an operator;
a real robot that is installed in a work space and performs a series of works constituted of a plurality of steps;
a camera configured to image the real robot;
a display device configured to display video information of the real robot imaged by the camera and a virtual robot; and a control device configured to:
  operate the virtual robot displayed on the display device in a state based on instruction information input from the operating device, and
  operate, after operating the virtual robot, the real robot in a state corresponding to the state that the virtual robot is displayed on the display device when operation execution information to execute an operation of the real robot is input from the operating device.

2. The robot system according to claim 1, wherein the control device is configured to display the virtual robot and the video information of the real robot imaged by the camera so as to overlap each other on the display device, and operate the virtual robot based on the instruction information when the instruction information is input from the operating device.

3. The robot system according to claim 1, wherein the camera is disposed at a distal end of the real robot.

4. The robot system according to claim 1, wherein the operating device is constituted of at least one of a mobile terminal, a touch panel, a master arm, a teaching pendant, a joystick, or a voice input device.

5. The robot system according to claim 1, wherein
  the operating device is constituted of a measuring device that measures movement of a hand of the operator, and
  the control device is configured to display a virtual hand on the display device so as to correspond to movement of the hand of the operator measured by the measuring device.

6. The robot system according to claim 1, wherein the display device is constituted of a transmission type display device configured to allow the operator to visually recognize a real world.

7. The robot system according to claim 6, wherein the display device is configured to be attachable to the operator.

8. A method for operating a robot system, wherein the robot system includes:
  an operating device that receives an operation instruction from an operator;
  a real robot that is installed in a work space and performs a series of works constituted of a plurality of steps;
  a camera configured to image the real robot; and
  a display device configured to display video information of the real robot imaged by the camera and a virtual robot, and the method comprising:
  (A) displaying, by the display device, the video information of the real robot imaged by the camera and the virtual robot;
  (B) displaying, by the display device, an operation of the virtual robot based on instruction information input from the operating device, after the (A); and
  (C) causing the real robot to operate based on the instruction information input from the operating device after the display device displays the operation of the virtual robot when operation execution information is input from the operating device to execute an operation of the real robot, after the (B), the real robot operating in a state corresponding to the operations of the virtual robot.

9. The method for operating the robot system according to claim 8, wherein, in the (A), the display device displays the virtual robot so as to overlap the video information of the real robot.

10. The method for operating the robot system according to claim 8, wherein the camera is disposed at a distal end of the real robot.

11. The method for operating the robot system according to claim 8, wherein the operating device is constituted of at least one of a mobile terminal, a touch panel, a master arm, a teaching pendant, a joystick, or a voice input device.

12. The method for operating the robot system according to claim 8, wherein
  the operating device is constituted of a measuring device that measures movement of a hand of the operator, and
  in the (B), the display device displays a virtual hand so as to correspond to movement of the hand of the operator measured by the measuring device, and displays the operation of the virtual robot.

13. The method for operating the robot system according to claim 8, wherein the display device is constituted of a transmission type display device configured to allow the operator to visually recognize a real world.

14. The method for operating the robot system according to claim 13, wherein the display device is configured to be attachable to the operator.

* * * * *